H. S. HUNTER.
ADJUSTMENT FOR INSERTED MILLING SAW TEETH.
APPLICATION FILED NOV. 21, 1917.
1,295,171. Patented Feb. 25, 1919.
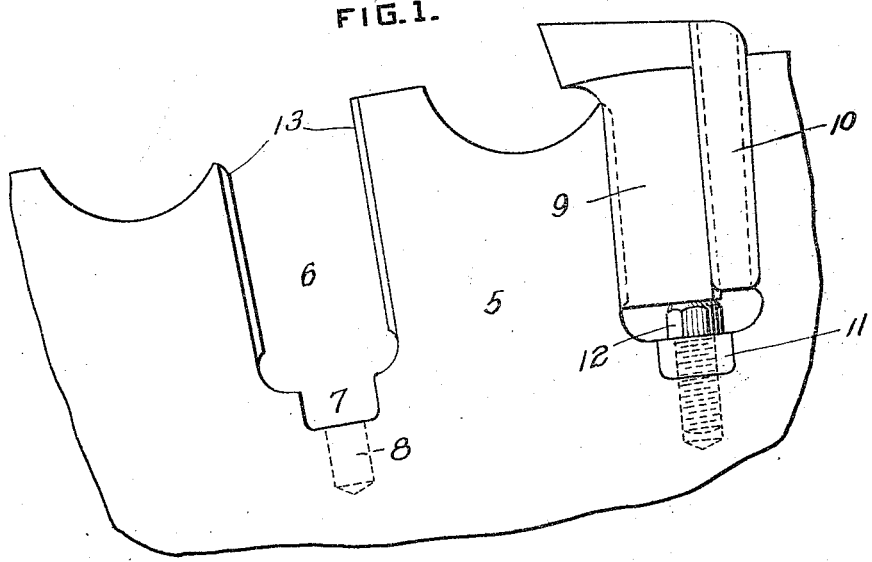
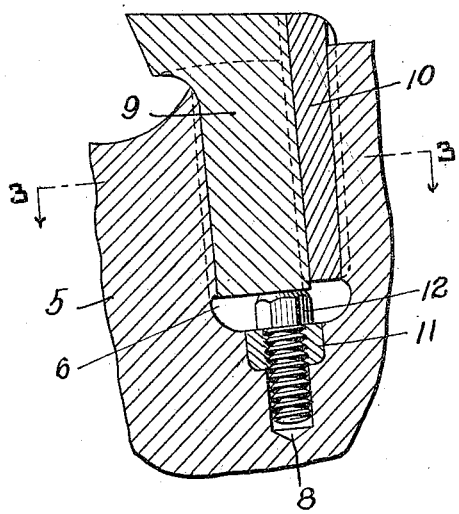
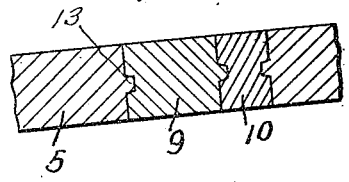
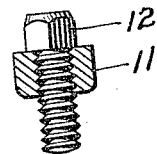
WITNESSES
J. Herbert Bradley.
INVENTOR
Harry S. Hunter

UNITED STATES PATENT OFFICE.

HARRY S. HUNTER, OF PITTSBURGH, PENNSYLVANIA, ASSIGNOR TO HUNTER SAW & MACHINE COMPANY, OF PITTSBURGH, PENNSYLVANIA, A CORPORATION OF PENNSYLVANIA.

ADJUSTMENT FOR INSERTED MILLING-SAW TEETH.

1,295,171.  Specification of Letters Patent.  Patented Feb. 25, 1919.

Application filed November 21, 1917. Serial No. 203,143.

*To all whom it may concern:*

Be it known that I, HARRY S. HUNTER, a citizen of the United States, and a resident of Pittsburgh, in the county of Allegheny and State of Pennsylvania, have made a new and useful Invention in Adjustments for Inserted Milling-Saw Teeth, of which the following is a specification.

The object of this invention is to provide simple and effective means for determining the position or adjustment of removable saw teeth; the invention being designed primarily for metal cutting saws although applicable to removable saw teeth generally without regard to their use.

Heretofore various tooth adjusting means have been devised and among others an abutment screw has been threaded into the saw blade at the bottom of the tooth slot or cavity in line with the tooth, and while this in the first instance or until the screw becomes rusted in its threads within the blade, is an efficient adjusting means it is objectionable. When the screw becomes rusted in the blade it not only renders the adjustment inoperative but often breaks off and has to be drilled out. The present invention obviates this difficulty.

In the drawings forming a part of this application, Figure 1 represents a segment of the periphery of a metal saw embodying this invention; Fig. 2 is a sectional elevation of a portion of the saw; Fig. 3 is a cross section taken on line 3—3 of Fig. 2 and Fig. 4 is a detailed view of the adjusting device.

Referring to the drawings, 5 designates the blade of a milling or other saw formed with the usual tooth confining sockets 6. In the present adaptation the inner extremity of each socket is formed with a sub-socket 7 and from this a bore 8 extends radially inward. A removable tooth or cutter 9 is secured within its socket by means of a wedge 10 and the meeting edges of the cutter, wedge and socket are interlocked by means of suitable beads 13 to prevent lateral displacement. A block 11 snugly fitting sub-pocket 7 and of rectangular formation to prevent turning in the sub-pocket is drilled and tapped through from top to bottom to accommodate an adjustment screw 12, the lower end of which lies within bore 8; bore 8 being of sufficient diameter to accommodate the greatest diameter of the threads of the screw. The top of the head of screw 12 forms an adjustable abutment for tooth 9 and by means of this screw a micrometer adjustment of the tooth may be obtained. If desired block 11, or screw 12, or both may be made of material such as bronze in order that the screw will not rust in the block. If desired, however, the block may be made of steel and if the screw should rust within the block it, with the screw, may be removed and a new block and screw replaced for adjusting purposes.

Some of the teeth of the saw may be formed for roughing and others for finishing in accordance with the usual practice.

Having thus described my invention what I claim is—

1. The combination of a saw blade formed with a tooth socket, a removable block in the bottom of said socket, an adjustment screw threaded through said block and extending into an unthreaded bore in said blade, a tooth in said socket, and means for securing said tooth in said socket.

2. The combination of a saw blade formed with a tooth socket, a removable block in a pocket subjacent to said socket, an adjusting screw threaded through said block and extending into an unthreaded bore in said blade, a tooth in said socket and a wedge for holding said tooth in said socket.

3. The combination of a saw blade formed with a toothed socket, a removable block located in a pocket subjacent to said socket and prevented from turning therein, an adjustment screw threaded through said block and extending into an unthreaded bore in said blade and a wedge for locking said tooth in said socket.

4. The combination of a saw blade formed with a toothed socket, a tooth in said socket, a substantially rectangular removable block located in a pocket subjacent to said toothed socket, an adjustment screw threaded through said block and extending into an unthreaded bore in said blade below said pocket and a wedge for locking said tooth in said socket.

In testimony whereof I have hereunto subscribed my name this 19th day of November, 1917.

HARRY S. HUNTER.

Witness:
E. B. MOLTER.

---

Copies of this patent may be obtained for five cents each, by addressing the "Commissioner of Patents, Washington, D. C."